(12) United States Patent
Hubbard et al.

(10) Patent No.: US 8,226,299 B2
(45) Date of Patent: Jul. 24, 2012

(54) ROLLER BEARING BACKING RING

(75) Inventors: Paul A. Hubbard, Petersburg, VA (US);
Mark W. K. Fetty, Chesterfield, VA
(US); John Oliver, Flossmoor, IL (US)

(73) Assignee: Amsted Rail Company, Inc., Chicago, IL (US)

( * ) Notice: Subject to any disclaimer, the term of this patent is extended or adjusted under 35 U.S.C. 154(b) by 425 days.

(21) Appl. No.: 12/584,820

(22) Filed: Sep. 14, 2009

(65) Prior Publication Data
US 2011/0064347 A1    Mar. 17, 2011

(51) Int. Cl.
*F16C 33/58* (2006.01)
*F16C 43/04* (2006.01)

(52) U.S. Cl. ........................................ 384/564; 384/585

(58) Field of Classification Search .................. 384/459, 384/564, 584, 585; 295/36.1, 37, 42.1, 43; 301/111.01, 111.03, 111.07
See application file for complete search history.

(56) References Cited

U.S. PATENT DOCUMENTS

| 7,219,938 B2 * | 5/2007 | Brister et al. ................. 384/459 |
| 2005/0078897 A1 * | 4/2005 | Zhang ............................ 384/476 |
| 2008/0085069 A1 * | 4/2008 | Toth et al. ..................... 384/459 |

* cited by examiner

*Primary Examiner* — James Pilkington
(74) *Attorney, Agent, or Firm* — Edward J. Brosius

(57) ABSTRACT

A novel two-piece backing ring assembly for a railcar axle is presented. The backing ring assembly has an annular body affixed to the fillet of the journal and a locking ring for further affixing the annular body into position on the journal. The locking ring has an inboard end affixed to the dust guard of the shaft and an outboard end for engaging a slot in the annular body. The locking ring assembly may be retrofitted to older generation railcar axles to increase the structural rigidity of the bearing assembly and minimize fretting wear caused by railcar axle deflection.

6 Claims, 3 Drawing Sheets

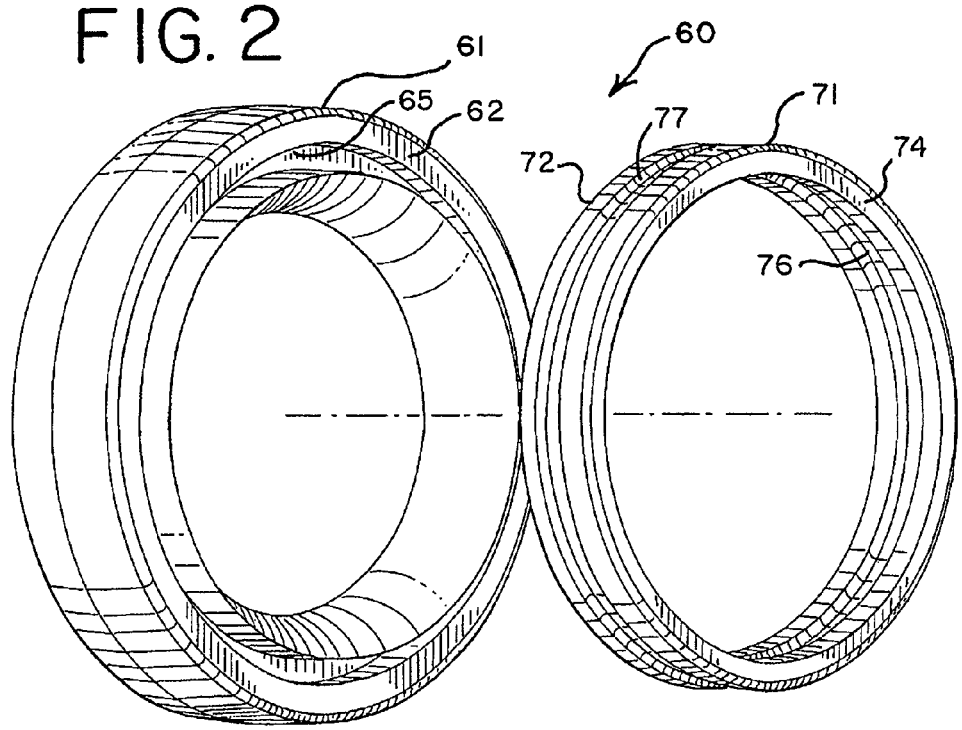
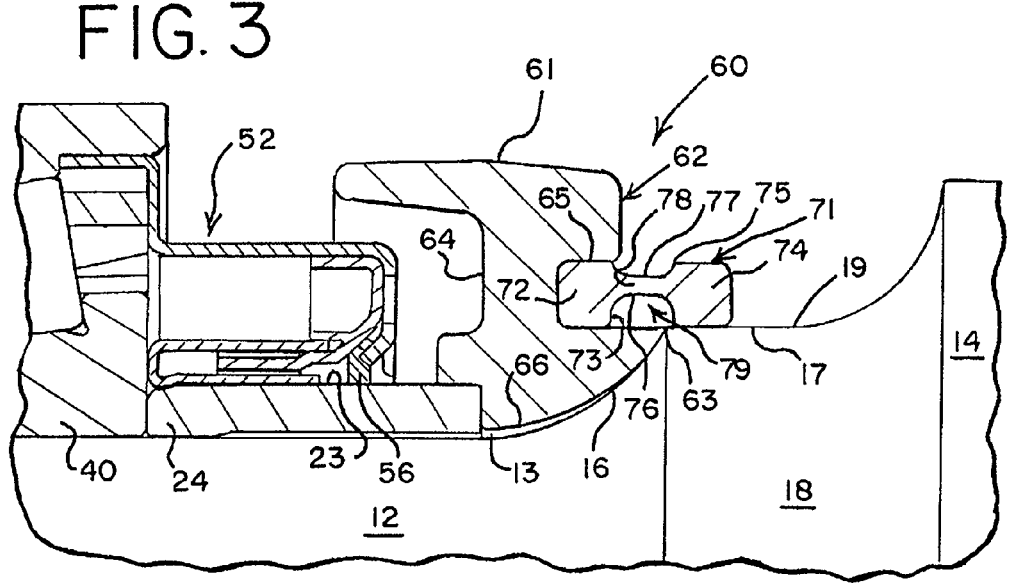

ROLLER BEARING BACKING RING

FIELD OF THE INVENTION

This invention relates to anti-friction bearings, and more particularly, in one embodiment, to the backing rings used with tapered roller bearings on railcar axles.

BACKGROUND OF THE INVENTION

Tapered roller bearings on railcar axles support operating loads capable of producing significant flexural deflections in the axle, and in particular, the journal portion of the shaft on which the tapered roller bearing is affixed. The stresses imposed by the operating loads are particularly high in the journal portion of the shaft at or near the backing ring.

As result of shaft deflections, the backing ring and the journal often experience fretting wear as the backing ring moves relative to the journal. Fretting wear may be sufficient to loosen the backing ring, increasing the axial play of the bearing on the journal. The loose backing ring accelerates wear on the bearing assembly and journal, potentially leading to shaft or bearing failure.

In an effort to reduce fretting wear failures, new backing ring and axle standards were developed and standardized for application to the railway industry. This new design is now embodied in the current generation backing ring which is in service today on many railcar axles.

The current generation backing ring design is a single piece component having an annular lip extending concentrically over the dust guard portion of the shaft. The lip of the backing ring produces an interference fit with the dust guard. The current generation backing ring is termed a "fitted" backing ring because of this interference fit. This is also the basis for distinguishing between the current generation fitted backing ring and the prior generation non-fitted backing ring. The prior generation non-fitted backing ring does not have a projecting lip and cannot connect to the dust guard. This substantially reduces the rigidity of the non-fitted backing ring in comparison to the fitted backing ring. As a result, prior generation railcar axle assemblies have higher wear rates than the current generation.

The specifications under the new standards apply not only to the fitted backing ring, but also to the dust guard on the railcar axle. The new standards require a closely toleranced dust guard diameter in order to produce an interference fit with the lip of the fitted backing ring.

New axles using the current generation fitted backing ring have slightly larger dust guard outer diameters than the prior generation railcar axles. The current generation fitted backing rings, however, can still be used interchangeably with the prior generation railcar axles. Although fitted backing rings will fit prior generation railcar axles, they will not produce an interference fit over the dust guard outer diameter. Consequently, certain advantages of fitted backing rings are not realized when used to recondition bearings on prior generation railcar axles.

SUMMARY OF THE INVENTION

To reduce the potential for fretting wear on journals and backing rings, a novel backing ring assembly is presented having increased stability to reduce fretting wear. The novel backing ring assembly is composed of two components: (1) an annular body affixed to the fillet of the journal and (2) a locking ring to connect with and further affix the annular body on the journal. The locking ring has an outboard end engaging the annular body and an inboard end affixed to the outer diameter of the dust guard. The locking ring reduces axial movement in the annular body resulting from shaft and journal deflection.

Because bearings are a high-value component, manufactured to stringent quality standards, it is generally the practice of the railway industry to recondition worn bearing assemblies. This backing ring assembly may be retrofitted to prior generation railcar axles with the modification of the prior generation backing ring. Likewise, fitted backing rings may be modified to accept a locking ring to produce the novel backing ring assembly. Alternatively, in either the prior generation or the current generation railcar axles, a new backing ring assembly may be installed during bearing reconditioning. This novel backing ring assembly may also be manufactured and used in conjunction with newly manufactured current generation railcar axles to produce an alternative to the fitted backing ring.

BRIEF DESCRIPTION OF THE FIGURES

Various embodiments of the novel backing ring assembly are described and illustrated in the accompanying figures. The figures are provided as examples only and are not intended to be considered as limitations to the invention. Consequently, the bearing assembly including the backing ring assembly are illustrated by way of example and not by limitation in the accompanying figures in which:

FIG. 2 is an exploded isometric view of one embodiment of the backing ring assembly;

FIG. 3 is an enlarged sectional view of the backing ring assembly for the bearing assembly illustrated in FIG. 1;

DETAILED DESCRIPTION

Figure 1:
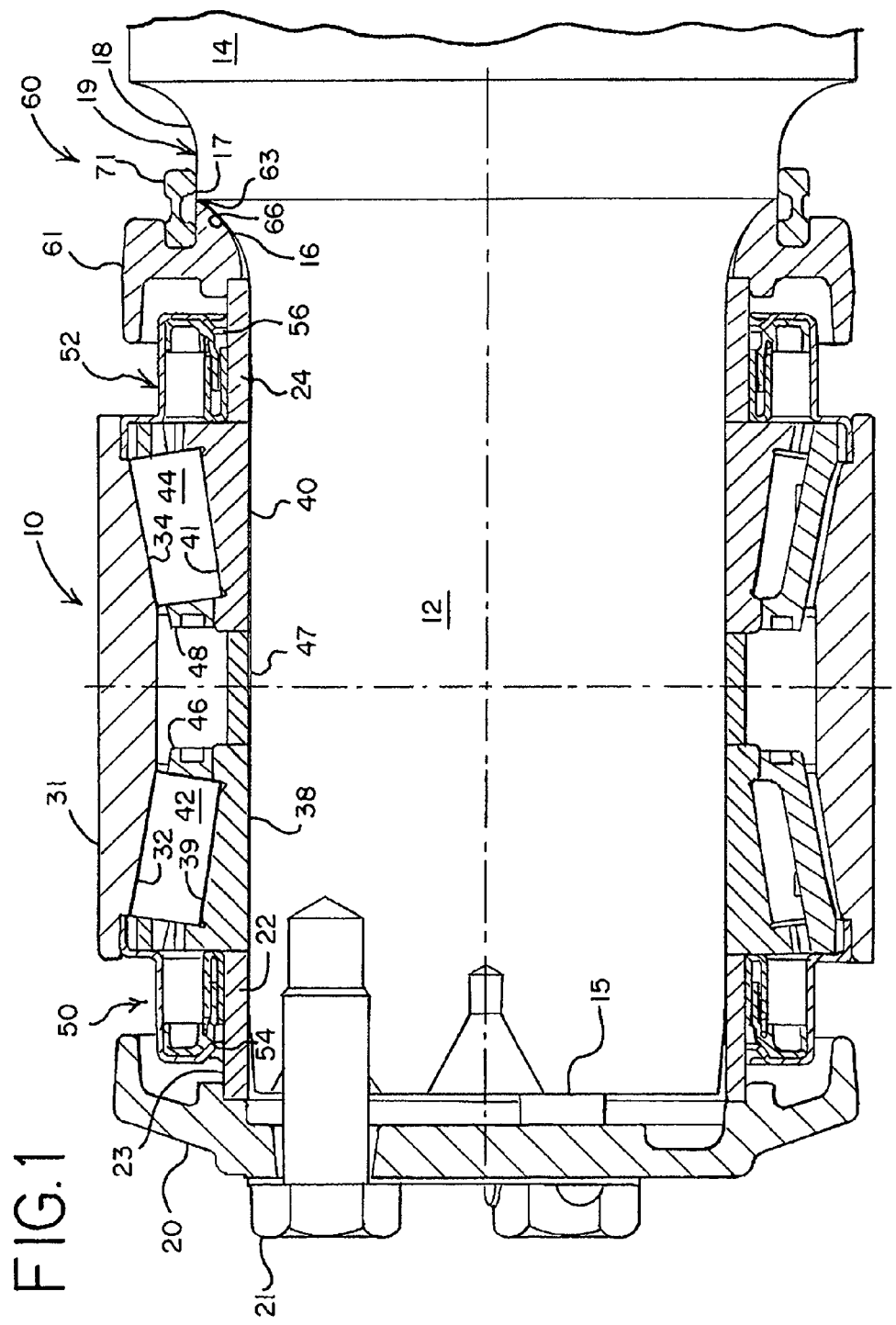
FIG. 1 is a sectional view of one embodiment of the novel backing ring assembly.

Referring to FIG. 1, one embodiment of the backing ring assembly is illustrated. In this embodiment, the bearing assembly 10 is a tapered roller bearing of the type commonly used in railway applications to support a railcar wheel. The bearing assembly 10 described in the following embodiments, however, may be adapted for use in many other common industrial applications. Consequently, the bearing assembly 10 illustrated and described below in relation to a tapered roller bearing assembly for a railcar wheel is for convenience only.

The bearing assembly 10 is typically preassembled before being mounted on a shaft 14 (e.g., a railcar axle). At each free end of the shaft 14, a journal 12 terminates in a slightly conical tapered section 15 to facilitate installation of the bearing assembly 10 onto the journal. The bearing assembly 10 is pressed onto the journal 12 of the shaft 14 to establish an interference fit.

A dust guard 18 with a larger diameter than the journal 12 is located axially inward from the journal 12. Axially inward from the dust guard 18, the shaft 14 extends to its largest diameter. The weight of the railcar is transferred through the bearing assembly 10 to the shaft and further transferred to ground through the railcar wheels (not shown) fitted inboard of the dust guard on the shaft.

Some bearing assemblies 10 have wear rings 22, 24 fitted over the journal 12 and which abut each end of the bearing assembly 10. The wear rings 22, 24 typically have an inner diameter dimension to provide an interference fit with the journal 12 over at least a portion of their length. The wear rings 22, 24 rotate with the shaft as it turns.

Although the bearing assembly 10 is pressed onto the journal 12, further restraint is generally required against axial loads. To provide this axial restraint, the bearing assembly 10 is captured between a backing ring assembly 60 at the inboard side and a bearing retaining cap 20 at the outboard side of the bearing assembly 10.

At the inboard side of the journal 12, the bearing assembly 10 is captured by the annular body 61 through the interposed and abutting wear ring 24. The annular body 61 has an inner contoured surface 66 allowing a tight or is affixed to a complementary surface fit with a complementary surface on the fillet 16 on the inboard end of the journal 12. The fillet 16 leads to a shoulder 17, the shoulder extending to form a dust guard 18 having a cylindrical surface 19. The annular body 61 has an inboard distal edge 63 at the contoured surface 66, generally abutting the shoulder 17.

A locking ring 71, affixed to the dust guard 18, engages the annular body 61 and restrains the annular body against deflection and axial displacement. The annular body 61 and the locking ring 71 together form the backing ring assembly 60. The annular body 61, the furthest inboard component affixed to the journal 12, affixes the bearing assembly 10 against axially inward displacement.

At the outboard end of the journal, the bearing assembly 10 is captured by the bearing retaining cap 20 through the interposed and abutting outboard wear ring 22. The bearing retaining cap 20 is affixed to the free end of the journal 12 with cap screws or bolts 21 threaded into a plurality of threaded bores. The bearing retaining cap 20 completes the mounting of the bearing assembly 10 onto the journal 12, providing a clamping force to restrain the bearing assembly against axially outward displacement.

The bearing assembly 10 is preassembled from a number of individual components, including two bearing cones 38, 40 and a bearing cup 31. The bearing cup 31 has an inner surface having radially inward directed outer raceways 32, 34. The bearing cones 38, 40 have radially outward directed inner raceways 39, 41. A center spacer 47 is positioned between the bearing cones 38, 40 to maintain the cones in accurately spaced position relative to each other and allow for proper bearing lateral clearance. The outer raceways 32, 34 in the bearing cup 31 cooperate with the inner raceways 39, 41 in the bearing cones 38, 40 to capture and support two rows of the tapered rollers 42, 44. In some embodiments, cages 46, 48 maintain the circumferential spatial positioning of the rollers 42, 44.

Bearing seals 50, 52 cover the ends of the bearing assembly 10 to minimize both lubricant leakage from the bearing and intrusion of contaminants into the bearing. In one embodiment, the bearing seals 50, 52 are affixed to the stationary (i.e., non-rotating) side of the bearing assembly 10 (such as the bearing cup 31) by interference fit or other appropriate method.

A seal body 54, 56 (typically of elastomeric construction) is attached to the bearing seal 50, 52 to form a dynamic seal between stationary and moving bearing assembly components. In one embodiment, the seal body 54, 56 is urged against the wear ring 22, 24 to seal the bearing assembly 10.

The wear rings 22, 24 protect the journal 12 against rubbing wear from the seal body 54, 56 by providing a wear surface 23. Direct contact between the seal body 54, 56 and the journal 12 could potentially create sufficient rubbing wear to degrade and potentially cause shaft failure.

In another embodiment, wear rings 22, 24 are not required. Instead, the bearing seal itself 50, 52 (instead of the wear rings 22, 24) provides the wear surface (i.e., a rotating surface) against which the seal body 54, 56 forms a seal. In this embodiment, the bearing seals 50, 52 comprise two components: an outer seal case and an inner seal case (inner and outer seal case not shown).

The outer seal case, similar to the embodiment described above, is affixed to the bearing cup and has a seal body. The inner seal case is a generally cylindrical housing affixed to the bearing cone which rotates with the shaft 14. The inner seal case has a wear surface to which the seal body extends to contact and create a dynamic seal. This type of bearing seal may be referred to as a cone riding bearing seal because the inner seal case is affixed to the bearing cone.

With the cone riding bearing seal, the bearing assembly 10 does not have wear rings. In this embodiment, the bearing assembly is clamped directly between the backing ring assembly and the bearing retaining cap. In contrast, in the other bearing assembly embodiment, wear rings directly abut each end of the bearing assembly at the inboard and outboard ends of the bearing cones. Regardless of the type of bearing seal employed, the novel backing ring assembly 60 can be applied to either type of bearing seal embodiment.

In addition to its application to a wide variety of bearing assembly designs, this novel backing ring assembly can also be applied to a variety of current and prior generation railcar axles and bearing assemblies. For example, this novel backing ring assembly can be incorporated into the production of new axle and bearing assemblies as an alternative to railcar axles with fitted backing rings; or retrofitted into previous generation railcar axles and bearing assemblies with non-fitted backing rings. The novel backing ring assembly can also be retrofitted into current generation railcar axles with tightly toleranced, fitted backing rings.

Referring to FIG. 2, an exploded isometric illustration of the backing ring assembly 60 is provided. The backing ring assembly 60 comprises two interlocking components: 1) an annular body 61 and 2) a locking ring 71. The locking ring 71 has an outboard end 72 to engage with a slot 65 in the axially inward directed surface 62 of the annular body 61.

In this embodiment, the inboard end 74 and the outboard end 72 have distinct and separate annular shapes: the inboard end 74 and the outboard end 72 having different inner and outer diameters. In other embodiments, the inboard end and the outboard end may have the same sized outer or inner diameters.

Referring to FIG. 3, the backing ring assembly 60 of FIGS. 1 and 2 is illustrated in an enlarged sectional view. The annular body 61 has an inner contoured surface 66 affixed to the journal 12 at the complementary surface of the fillet 16. In this embodiment, the inner contoured surface 66 departs from the complementary surface of the fillet 16, creating a gap 13 between the annular body 61 and the fillet near the axially outward directed surface 64 of the annular body.

A slot 65 in the axially inward directed surface 62 of the annular body 61 receives the outboard end 72 of the locking ring 71 in an interference fit. In one embodiment, the slot 65 depth is sufficient to allow the outboard end 72 of the locking ring 71 to engage the annular body without contacting the cylindrical surface 19 of the dust guard 18 (i.e., generally disposing the outboard end 72 in the slot 65 radially outward from the fillet 16).

The locking ring 71 further has an inboard end 74 for receiving the cylindrical surface of the dust guard 18. In this embodiment, the annular inboard end 74 encircles the dust guard 18 in an interference fit.

The inboard end 74 and the outboard end 72 are connected, in one embodiment, by a connecting member 78. In one embodiment, the connecting member 78 has an annular shape with an inner surface 73 and outer surface 75. The connecting member 78, in one embodiment, depending upon the inner and outer diameters of the inboard and outboard ends of the locking ring 71, may obliquely connect each end of the locking ring. This establishes a type of cantilever in the connecting member 78 between the two ends of the locking ring 71.

In one embodiment, the locking ring 71 may have a circumferential, inner groove 76 in its inner cylindrical surface 73. The inner groove 76 in the locking ring 71 increases the flexibility of the locking ring between the inboard end 74 and the outboard end 72.

In another embodiment, a circumferential outer groove 77 may be in the outer cylindrical surface 75 of the locking ring 71. This further reduces the axial cross-section of the locking ring 71, increasing its flexibility. Any combination of inner and outer grooves, or no grooves, may be present in the locking ring 71.

The locking ring 71, with its connection between the annular body 61 and the cylindrical surface 19 of the dust guard 18, reinforces and anchors the annular body 61 against axial displacement and deflection. It is believed that the flexibility of the locking ring 71 allows the annular body 61 to more readily move with the deflection of the journal 12, yet, still allow the locking ring to restrain the axial displacement of the annular body, reducing its movement relative to the journal.

In addition to providing resistance to deflection from dynamic loads applied to the shaft 14, the inner groove 76 provides an opportunity to seal the circumferential joint along the abutment of the distal edge 63 of the annular body 61 with the shaft 14. The joint produced by this abutment provides a potential pathway for moisture intrusion into the bearing assembly. In this embodiment, after the backing ring assembly 60 is affixed to the shaft, the circumferential, inner groove 76 is generally located radially outward of the circumferential joint. The inner groove in this configuration forms an annular volume 79.

Figure 4:
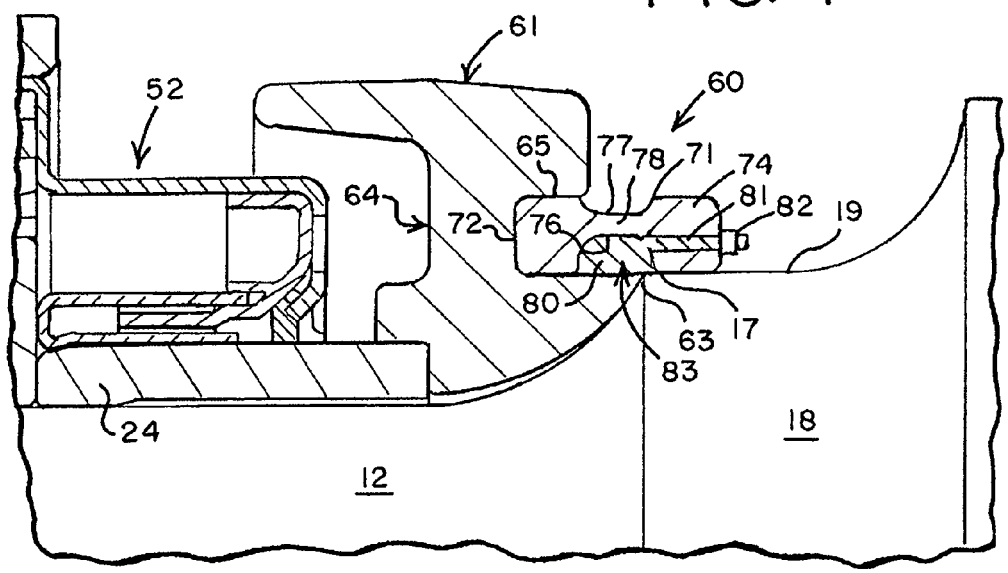
FIG. 4 is an enlarged sectional view of the backing ring assembly for the bearing illustrated in FIG. 3 with a backing ring seal.

Referring to FIG. 4, the annular volume formed by the inner groove 76 may be, in one embodiment, connected by a passage 81 to the exterior of the bearing and may terminate at a fitting 82. The annular volume may be filled with a sealant 83 (e.g., such as silicone RTV) through the passage 81. When set (e.g., cross-linked), the sealant 83 produces a moisture resistant, backing ring seal 80 around the circumference of the joint. In another embodiment, a backing ring seal may be formed in both the inner groove 76 and the outer groove 77 of the backing ring assembly 60.

In still another embodiment, the inner groove 76 may be dimensioned to accept an o-ring, quad ring, or other similar type of elastomeric seal ring. The o-ring may be pre-fitted into the locking ring 71 prior to press fitting the locking ring onto the cylindrical surface 19 of the dust guard 18.

The novel backing ring assembly discussed above, may be incorporated as a retrofit into both current and prior generation bearing assemblies requiring reconditioning. These retrofit procedures generally require machining the fitted or non-fitted backing ring into a configuration that can accept a locking ring.

For the prior generation, non-fitted backing ring, a retrofit procedure can be implemented to machine the appropriate sized slot into the axially inward directed surface of the non-fitted backing ring (in effect creating the annular body 61 of the backing ring assembly 60) to accommodate a locking ring 71.

Although prior generation railcar axles have smaller and loosely toleranced dust guards to which the inboard end 74 of the locking ring 71 is affixed, press type interference fits are achieved even with a standardized size backing ring assembly 60 for installation on either prior or current generation rail car axles. It is believed that the flexibility of the connecting member 78, bridging the outboard end 72 and inboard end 74 of the locking ring 71, provides a mechanism for achieving this press type interference fit.

In addition to reconditioning prior generation railcar axle assemblies, the backing ring assembly can also be retrofitted to the current generation of railcar axles with fitted backing rings. Although much improved, the current generation of fitted backing rings and railcar axles are still susceptible to wear related degradation and periodically require reconditioning.

Figure 5:
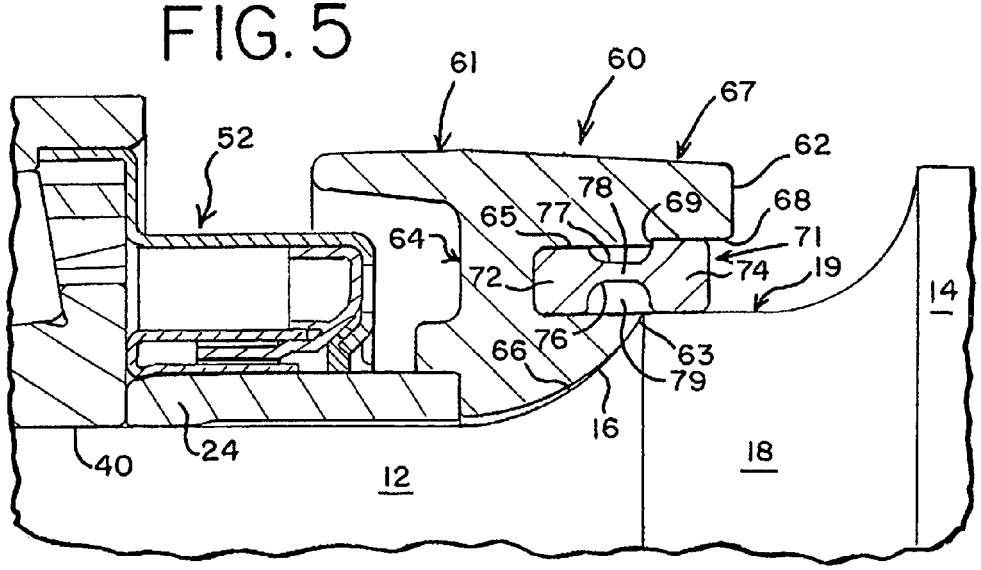
FIG. 5 is an enlarged sectional view of one embodiment of the backing ring assembly retrofitted to a current generation backing ring and railcar axle assembly.

Referring to FIG. 5, an illustration of a fitted backing ring, modified to accept the novel backing ring assembly 60 is depicted. The modified backing ring was machined from a fitted backing ring to form an annular body 61 capable of engaging with a locking ring 71. In this embodiment, two different machining processes were required for this retrofit.

The first machining process requires a counterbore in the fitted backing ring to accommodate the locking ring 71. The fitted backing ring has an annular lip 67 extending concentrically over the cylindrical surface 19 of the dust guard 18. The lip 67, however, interferes with the engagement of the locking ring 71. To accommodate the locking ring 71, a counterbore 69 is machined into the inner cylindrical surface of the annular lip 67.

The second machining process allows the annular body 61 to engage the locking ring 71. A slot 65 is machined into the axially inward directed surface 62 to accommodate the outboard end 72 of the locking ring 71. Machining these surfaces converts the fitted backing ring into the annular body 61, capable of accommodating the locking ring 71.

In this embodiment, the inboard end 74 of the locking ring 71 receives the cylindrical surface 19 of the dust guard 18 in an interference fit. The interference fit is readily controlled and reproducible because the current generation railcar axle has a closely toleranced dust guard. The final result is the incorporation of the backing ring assembly 60 into a fitted backing ring and railcar axle.

In another embodiment, the inboard end 74 of the locking ring 71 may have an interference fit not only with the cylindrical surface 19 of the dust guard 18, but also with the inner cylindrical surface of the annular lip 67.

Although the above discussion relates to the reconditioning of both current and prior generation railcar axle assemblies, is also possible to simply retrofit the railcar axle, either current or prior generation, with a new backing ring assembly. As noted above, the backing ring assembly can readily establish a press fit with the closely toleranced, current generation dust guard. Further, the locking ring, because of its connecting member, can also readily produce an interference fit with the prior generation railcar axle despite its loose tolerances.

While the invention has been illustrated with respect to several specific embodiments, these embodiments are illustrative rather than limiting. Various modifications and additions could be made to each of these embodiments as will be apparent to those skilled in the art. Accordingly, the invention should not be limited by the above description or of the specific embodiments provided as examples. Rather, the invention should be defined only by the following claims.

The invention claimed is:

1. A backing ring combination with a shaft having a journal at a free end of the shaft, the journal extending to a fillet merging with a shoulder of a larger diameter cylindrical surface, and with a bearing assembly affixed around the journal and a bearing retaining cap affixed to a free end of the journal to clamp the bearing assembly on the shaft, the backing ring comprising:
   an annular body affixed to the fillet, the annular body further having a slot; and
   a locking ring having an outboard end for engaging the slot and an inboard end for receiving the cylindrical surface, wherein the locking ring further comprises an inner groove on an inner surface of the locking ring, and wherein the locking ring further comprises an outer groove on an outer surface of the locking ring.

2. The backing ring according to claim 1, wherein the slot is in the axially inward facing surface of the annular body.

3. The backing ring according to claim 1, wherein the inboard end of the locking ring establishes an interference fit with the cylindrical surface.

4. The backing ring according to claim 1, wherein the outboard end of the locking ring establishes an interference fit with the slot.

5. The backing ring according to claim 1, wherein the outboard end and the inboard end of the locking ring are each annular.

6. The backing ring according to claim 5, wherein the locking ring further comprises a connecting member to connect the outboard end to the inboard end of the locking ring.

* * * * *